US012263562B2

(12) United States Patent
Weber et al.

(10) Patent No.: US 12,263,562 B2
(45) Date of Patent: Apr. 1, 2025

(54) BEARING RETAINER FOR A POWER TOOL (71) Applicant: MILWAUKEE ELECTRIC TOOL CORPORATION, Brookfield, WI (US)

(72) Inventors: Andrew J. Weber, Cudahy, WI (US); Mark A. Kubale, West Bend, WI (US); Jacob P. Schneider, Madison, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 638 days.

(21) Appl. No.: 16/164,007

(22) Filed: Oct. 18, 2018

(65) Prior Publication Data

US 2019/0118352 A1 Apr. 25, 2019

Related U.S. Application Data

(60) Provisional application No. 62/574,785, filed on Oct. 20, 2017.

(51) Int. Cl.
*B25B 21/02* (2006.01)
*B25D 11/10* (2006.01)
(Continued)

(52) U.S. Cl.
CPC ............ *B25B 21/02* (2013.01); *B25D 11/104* (2013.01); *B25F 5/001* (2013.01); *B25F 5/02* (2013.01);
(Continued)

(58) Field of Classification Search
CPC . B25B 21/02; B25D 11/104; B25D 2211/065; B25D 2250/335;
(Continued)

(56) References Cited

U.S. PATENT DOCUMENTS 2,110,957 A * 3/1938 Kollock ............... B25D 11/108
173/109
2,662,434 A * 12/1953 Burkhardt ............... B25B 21/02
173/93.6
(Continued)

FOREIGN PATENT DOCUMENTS

CN 103236758 A 8/2013
CN 209329836 U 8/2019
(Continued)

OTHER PUBLICATIONS

International Search Report and Written Opinion for Application No. PCT/US2018/056458 dated Feb. 13, 2019, 20 pages.
(Continued)

*Primary Examiner* — Joshua G Kotis
*Assistant Examiner* — Scott A Howell
(74) *Attorney, Agent, or Firm* — Michael Best & Friedrich LLP (57) ABSTRACT

A power tool includes a motor housing and a motor supported within the motor housing. The motor includes an output shaft defining an axis. The power tool also includes a bearing configured to support the output shaft for rotation about the axis, an end cap removably coupled to the motor housing, and a bearing retainer integrally formed with the end cap. The bearing retainer is configured to axially and radially secure the bearing to the end cap.

14 Claims, 13 Drawing Sheets

(51) Int. Cl.
  *B25F 5/00* (2006.01)
  *B25F 5/02* (2006.01)
  *F16C 19/06* (2006.01)
  *F16C 35/067* (2006.01)
  *F16C 35/077* (2006.01)

(52) U.S. Cl.
  CPC ...... *F16C 35/067* (2013.01); *B25D 2211/065* (2013.01); *B25D 2250/335* (2013.01); *B25D 2250/371* (2013.01); *F16C 19/06* (2013.01); *F16C 35/077* (2013.01); *F16C 2220/02* (2013.01); *F16C 2226/30* (2013.01); *F16C 2322/50* (2013.01); *F16C 2380/26* (2013.01)

(58) Field of Classification Search
  CPC ...... B25D 2250/371; B25F 5/001; B25F 5/02; F16C 35/067; F16C 35/077; F16C 19/06; F16C 2220/02; F16C 2226/30; F16C 2322/50; F16C 2380/26
  See application file for complete search history.

(56) References Cited

U.S. PATENT DOCUMENTS

| | | | |
|---|---|---|---|
| 4,623,810 A | 11/1986 | Smith | |
| 4,991,472 A | 2/1991 | Hollingsworth | |
| 5,083,619 A * | 1/1992 | Giardino | B25B 21/02 173/104 |
| 5,361,853 A | 11/1994 | Takamura et al. | |
| 6,719,067 B2 * | 4/2004 | Taga | B25B 21/02 173/162.2 |
| 6,819,020 B2 | 11/2004 | Toya et al. | |
| 6,883,619 B1 * | 4/2005 | Huang | B25B 21/02 173/168 |
| 7,259,486 B2 | 8/2007 | Yamamoto | |
| 7,348,485 B2 | 3/2008 | Duesselberg et al. | |
| 7,355,316 B2 | 4/2008 | Yokota et al. | |
| 7,667,357 B2 | 2/2010 | Okada et al. | |
| 8,508,084 B2 | 8/2013 | Satterfield et al. | |
| 8,772,989 B2 | 7/2014 | Simm et al. | |
| 8,961,358 B2 * | 2/2015 | Hirabayashi | B25B 21/008 475/298 |
| 9,114,521 B2 * | 8/2015 | Yoshikawa | B25F 5/02 |
| 9,643,300 B2 * | 5/2017 | Kumagai | B25B 21/02 |
| 9,948,162 B2 | 4/2018 | Nagahama et al. | |
| 10,226,850 B2 | 3/2019 | Esenwein | |
| 10,434,635 B2 | 10/2019 | Blum et al. | |
| 10,903,718 B2 | 1/2021 | Nagahama et al. | |
| 10,960,529 B2 * | 3/2021 | Herr | B25B 21/00 |
| 11,000,934 B2 | 5/2021 | Esenwein | |
| 2003/0155142 A1 | 8/2003 | Kikuchi et al. | |
| 2006/0071567 A1 | 4/2006 | Acosta | |
| 2006/0290213 A1 | 12/2006 | Furui et al. | |
| 2008/0086869 A1 | 4/2008 | Acosta | |
| 2008/0142236 A1 | 6/2008 | Walker | |
| 2008/0229571 A1 | 9/2008 | Acosta | |
| 2010/0277015 A1 | 11/2010 | Simm et al. | |
| 2011/0083869 A1 * | 4/2011 | Lin | B25F 5/02 173/218 |
| 2012/0080963 A1 * | 4/2012 | Yoshikawa | B25F 5/02 310/50 |
| 2013/0205604 A1 | 8/2013 | Esenwein et al. | |
| 2013/0255981 A1 | 10/2013 | Noto et al. | |
| 2013/0270932 A1 | 10/2013 | Hatfield et al. | |
| 2014/0182869 A1 * | 7/2014 | Kumagai | B25F 5/02 173/93 |
| 2015/0231771 A1 * | 8/2015 | Sakai | B25B 21/026 173/176 |
| 2017/0203418 A1 * | 7/2017 | Kumagai | B25F 5/02 |
| 2017/0246732 A1 * | 8/2017 | Dey, IV | G01D 5/2006 |
| 2019/0061117 A1 | 2/2019 | Muramatsu et al. | |
| 2019/0118352 A1 * | 4/2019 | Weber | B25B 21/02 |
| 2019/0291258 A1 * | 9/2019 | Herr | B25F 5/001 |
| 2021/0099053 A1 | 4/2021 | Nagahama et al. | |
| 2021/0187707 A1 | 6/2021 | Smith et al. | |
| 2021/0194319 A1 | 6/2021 | Smith et al. | |
| 2021/0194320 A1 | 6/2021 | Smith et al. | |
| 2024/0075608 A1 | 3/2024 | Duncan et al. | |

FOREIGN PATENT DOCUMENTS

| | | |
|---|---|---|
| DE | 29815795 U1 | 10/1999 |
| DE | 102012218275 A1 | 4/2014 |
| DE | 102015210070 A1 | 12/2016 |
| DE | 102018204519 A1 | 9/2019 |
| EP | 2455196 A2 | 5/2012 |
| EP | 2743034 A2 | 6/2014 |
| JP | 2005014145 A | 1/2005 |
| WO | 2008138037 A1 | 11/2008 |
| WO | 2021078251 A1 | 4/2021 |
| WO | 2021200051 A1 | 10/2021 |
| WO | 2021200052 A1 | 10/2021 |

OTHER PUBLICATIONS

Partial Supplementary European Search Report for Application No. 18867957.5 dated Jun. 28, 2021 (12 pages).

Extended European Search Report for Application No. 18867957.5 dated Oct. 19, 2021 (4 pages).

* cited by examiner

BEARING RETAINER FOR A POWER TOOL

CROSS-REFERENCE TO RELATED APPLICATIONS

This application claims priority to co-pending U.S. Provisional Patent Application No. 62/574,785 filed on Oct. 20, 2017, the entire content of which is incorporated herein by reference.

FIELD OF THE INVENTION

The present invention relates to power tools, and more particularly to impact wrenches.

BACKGROUND OF THE INVENTION

Impact tools or wrenches are typically utilized to provide a striking rotational force, or intermittent applications of torque, to a tool element or workpiece (e.g., a fastener) to either tighten or loosen the fastener. As such, impact wrenches are typically used to loosen or remove stuck fasteners (e.g., an automobile lug nut on an axle stud) that are otherwise not removable or very difficult to remove using hand tools.

SUMMARY OF THE INVENTION

The present invention provides, in one aspect, a power tool including a motor housing and a motor supported within the motor housing. The motor includes an output shaft defining an axis. The power tool also includes a bearing configured to support the output shaft for rotation about the axis, an end cap removably coupled to the motor housing, and a bearing retainer integrally formed with the end cap. The bearing retainer is configured to axially and radially secure the bearing to the end cap.

The present invention provides, in another aspect, a power tool including a housing with a motor housing portion and a front housing portion coupled to the motor housing portion, a motor supported within the motor housing portion, the motor including an output shaft defining an axis, and an end cap removably coupled to the motor housing portion opposite the front housing portion. The power tool also includes a bearing configured to support the output shaft for rotation about the axis, an anvil extending from the front housing portion, and a drive assembly configured to convert torque from the output shaft into a striking rotational force on the anvil. The end cap includes a bearing retainer with a first wall extending parallel to the axis and opposed second and third walls extending transverse to the axis. The first wall engages a radial side of the bearing to radially secure the bearing, and the second and third walls engage opposite axial sides of the bearing to axially secure the bearing.

The present invention provides, in another aspect, a power tool including a housing with a removable end cap, a motor supported within the housing, the motor including an output shaft defining an axis and having a helical pinion, and a gear assembly including a plurality of helical planet gears meshed with the helical pinon such that rotation of the output shaft produces an axial force on the output shaft. The power tool also includes a bearing configured to support the output shaft for rotation about the axis. The end cap includes a bearing retainer configured to secure the bearing to the housing against the axial force on the output shaft.

The present invention provides, in another aspect, a method of assembling a power tool. The method includes molding an end cap around a bearing such that the bearing is secured to the end cap, coupling the bearing to an output shaft of a motor of the power tool, and coupling the end cap to a housing of the power tool such that the end cap defines a rear end of the power tool.

The present invention provides, in another aspect, a method of assembling a power tool. The method includes molding an end cap around a bushing such that the bushing is secured to the end cap, pressing a bearing into the bushing, coupling the bearing to an output shaft of a motor of the power tool, and coupling the end cap to a housing of the power tool such that the end cap defines a rear end of the power tool.

The present invention provides, in another aspect, a power tool including a housing and a motor supported within the housing, the motor including an output shaft defining an axis. The power tool also includes a first bearing and a second bearing, each bearing configured to support the output shaft for rotation about the axis. The power tool also includes an anvil extending from the housing, a gear case supported by the housing, and a drive assembly at least partially disposed within the gear case. The drive assembly is configured to convert torque from the output shaft into a striking rotational force on the anvil. The power tool also includes a first bearing retainer with a first wall extending parallel to the axis and a second wall extending transverse to the axis, and a second bearing retainer with a first wall extending parallel to the axis and a second wall extending transverse to the axis. The first wall of the first bearing retainer engages a radial side of the first bearing to radially secure the first bearing, and the second wall of the first bearing retainer engages an axial side of the first bearing to axially secure the first bearing in a first direction. The first wall of the second bearing retainer engages a radial side of the second bearing to radially secure the second bearing, and the second wall of the second bearing retainer engages an axial side of the second bearing to axially secure the second bearing in a second direction opposite the first direction.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
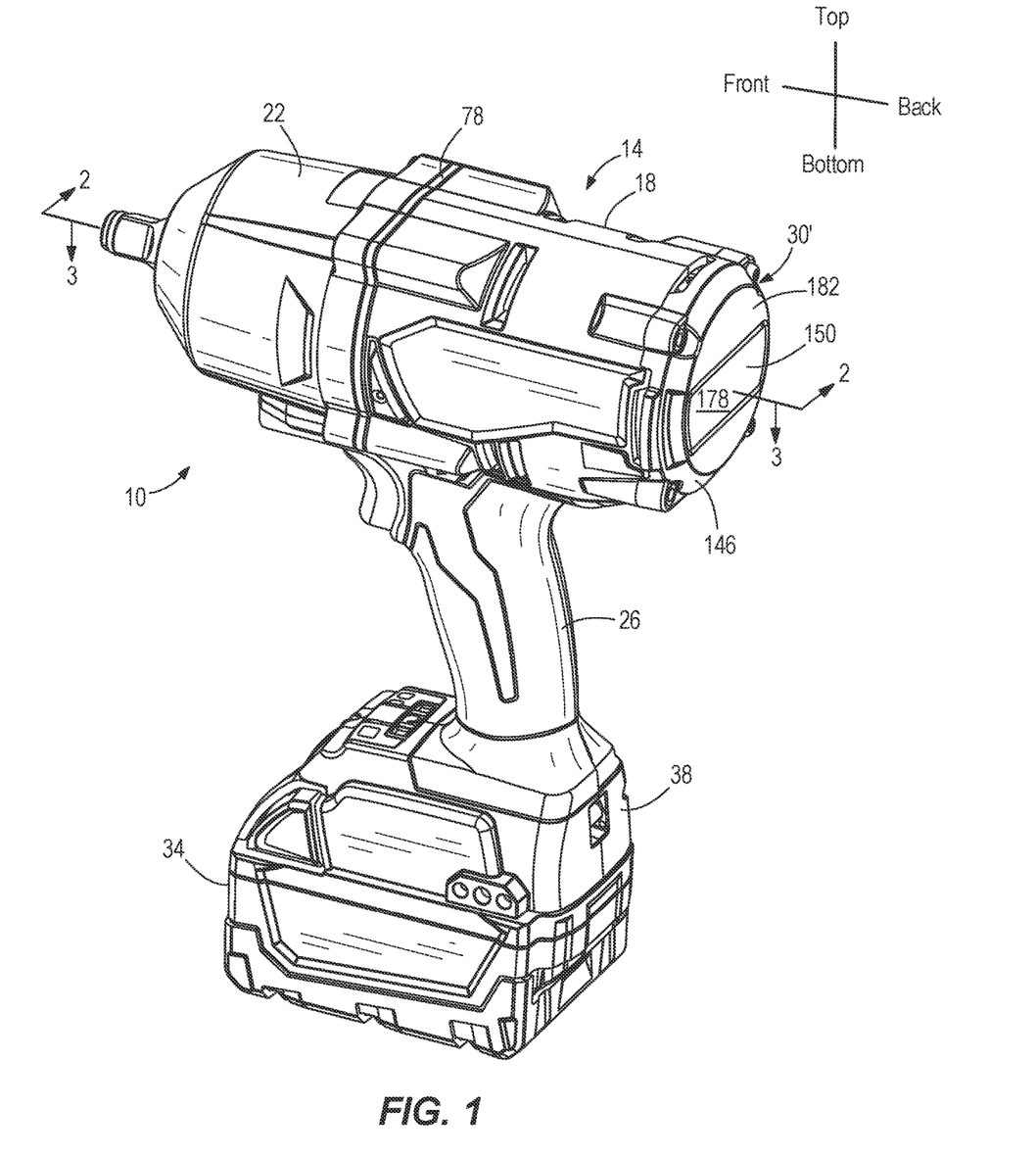
FIG. 1 is a perspective view of an exemplary power tool that may incorporate a bearing retainer according to an embodiment of the invention.

FIG. 1 illustrates a power tool 10 in the form of an impact wrench. The impact wrench 10 includes a housing 14 with a motor housing portion 18, a front housing portion 22 coupled to the motor housing portion 18 (e.g., by a plurality of fasteners), and a handle portion 26 extending downward from the motor housing portion 18. In the illustrated embodiment, the handle portion 26 and the motor housing portion 18 are defined by cooperating clamshell halves. The illustrated housing 14 also includes an end cap 30 coupled to the motor housing portion 18 opposite the front housing portion 22.

Figure 2:
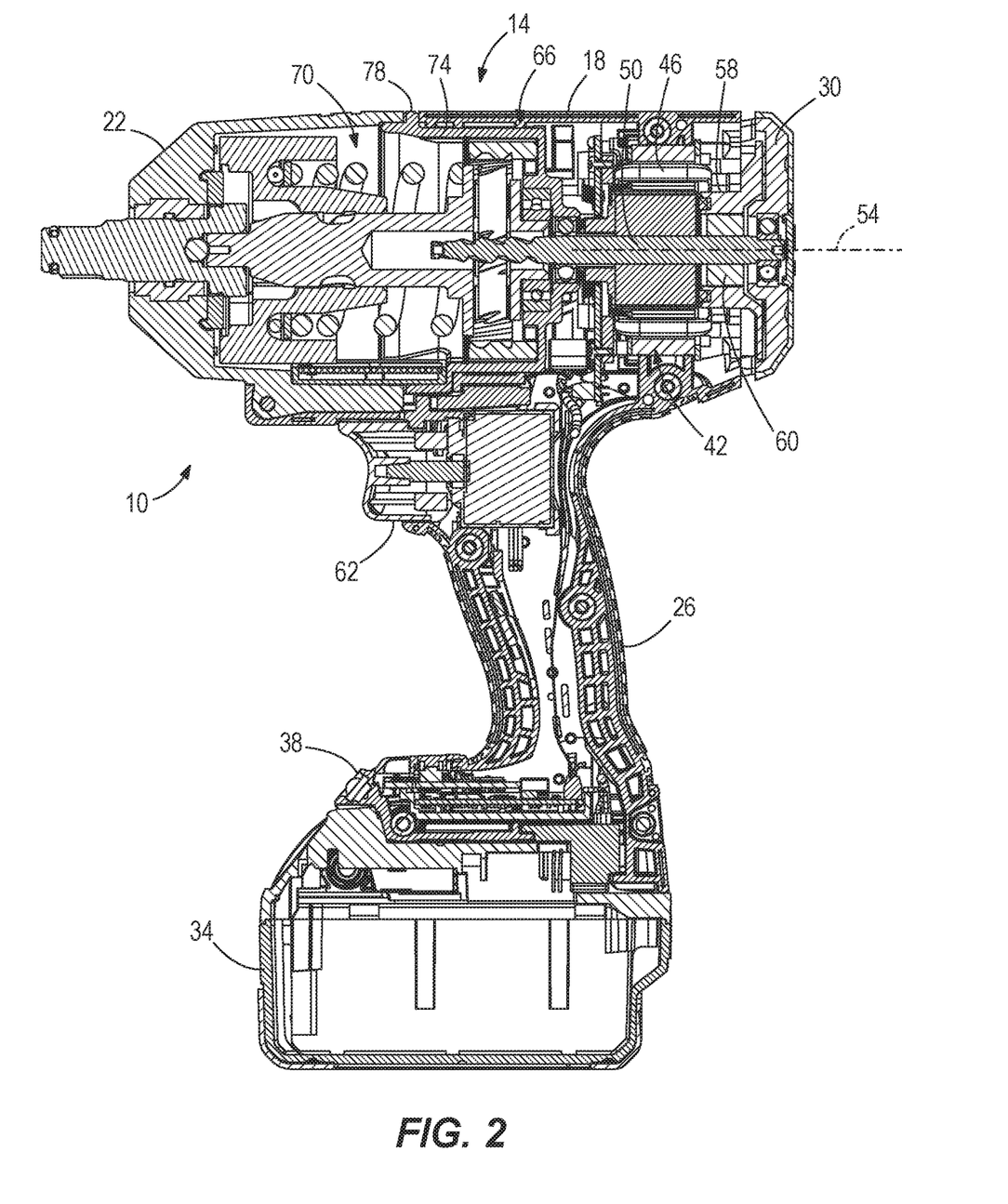
FIG. 2 is a cross-sectional view of the power tool of FIG. 1, taken along line 2-2 in FIG. 1.

Referring to FIGS. 1 and 2, the impact wrench 10 has a battery 34 removably coupled to a battery receptacle 38 located at a bottom end of the handle portion 26. An electric motor 42, supported within the motor housing portion 18, receives power from the battery 34 via the battery receptacle 38 when the battery 34 is coupled to the battery receptacle 38. In the illustrated embodiment, the motor 42 is a brushless direct current ("BLDC") motor with a stator 46 and an output shaft or rotor 50 that is rotatable about an axis 54 relative to the stator 46. In other embodiments, other types of motors may be used. A fan 58 is coupled to the output shaft 50 (e.g., via a splined member 60 fixed to the output shaft 50) behind the motor 42.

The impact wrench 10 also includes a switch (e.g., trigger switch 62) supported by the housing 14 that selectively electrically connects the motor 42 and the battery 34 to provide DC power to the motor 42. In other embodiments, the impact wrench 10 may include a power cord for electrically connecting the switch 62 and the motor 42 to a source of AC power. As a further alternative, the impact wrench 10 may be configured to operate using a different power source (e.g., a pneumatic or hydraulic power source, etc.).

The impact wrench 10 further includes a gear assembly 66 coupled to the motor output shaft 50 and a drive assembly 70 coupled to an output of the gear assembly 66. The gear assembly 66 may be configured in any of a number of different ways to provide a speed reduction between the output shaft 50 and an input of the drive assembly 70. The gear assembly 66 is at least partially housed within a gear case 74 fixed to the housing 14. In the illustrated embodiment, the gear case 74 includes an outer flange 78 that is sandwiched between the front housing portion 22 and the motor housing portion 18. The fasteners that secure the front housing portion 22 to the motor housing portion 18 also pass through the outer flange 78 of the gear case 74 to fix the gear case 74 relative to the housing 14.

Figure 3:
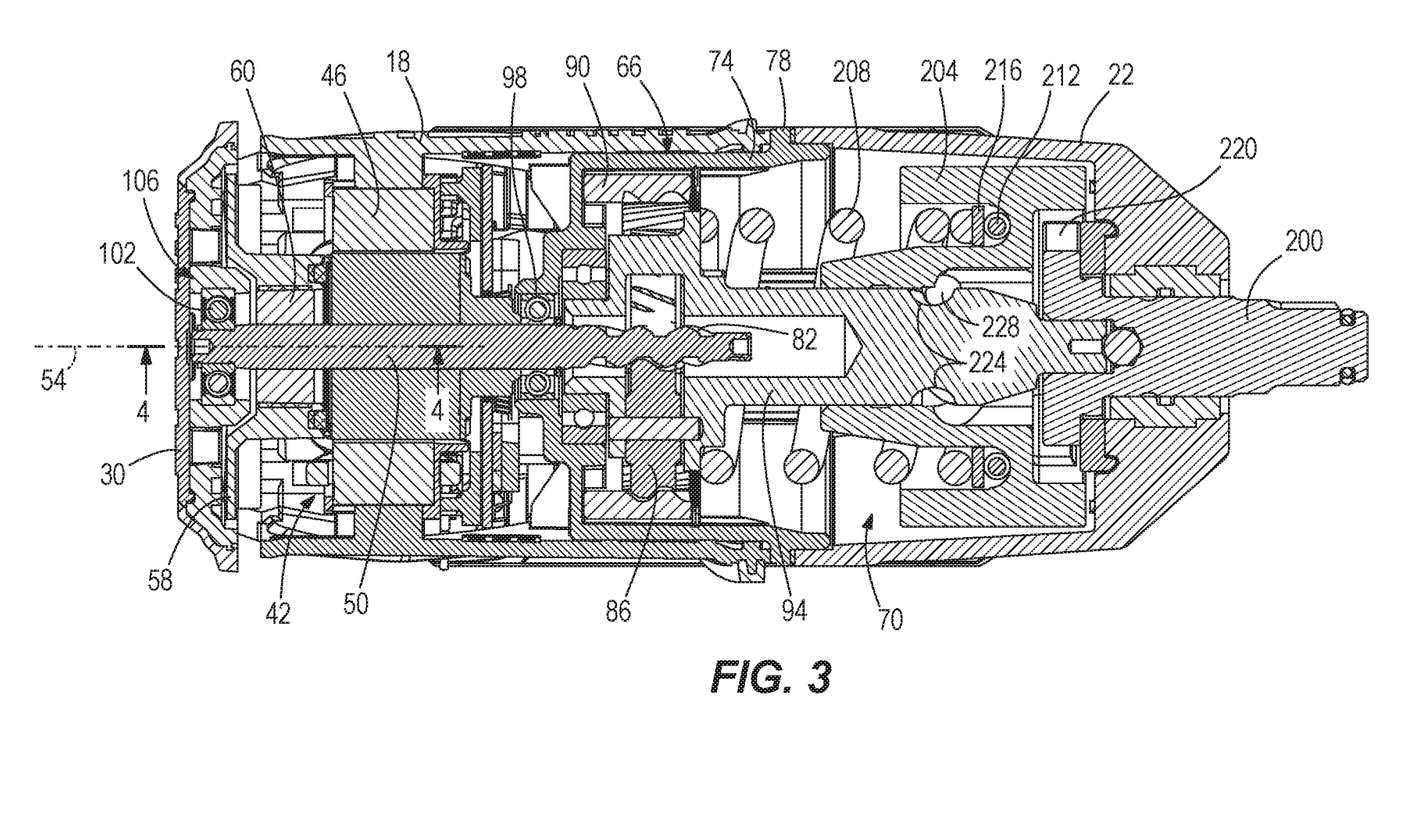
FIG. 3 is a cross-sectional view of the power tool of FIG. 1, taken along line 3-3 in FIG. 1.

Best illustrated in FIG. 3, the gear assembly 66 includes a helical pinion 82 formed on the motor output shaft 50, a plurality of helical planet gears 86 meshed with the helical pinion 82, and a helical ring gear 90 meshed with the planet gears 86 and rotationally fixed within the gear case 74. The planet gears 86 are mounted on a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotate the camshaft 94. The output shaft 50 is rotatably supported by a first or forward bearing 98 and a second or rear bearing 102. The helical gears 82, 86, 90 of the gear assembly 66 advantageously provide higher torque capacity and quieter operation than spur gears, for example, but the helical engagement between the pinion 82 and the planet gears 86 produces an axial thrust load on the output shaft 50. Accordingly, the impact wrench 10 includes a bearing retainer 106 that secures the rear bearing 102 both axially (i.e. against forces transmitted along the axis 54) and radially (i.e. against forces transmitted in a radial direction of the output shaft 50).

Figure 4:
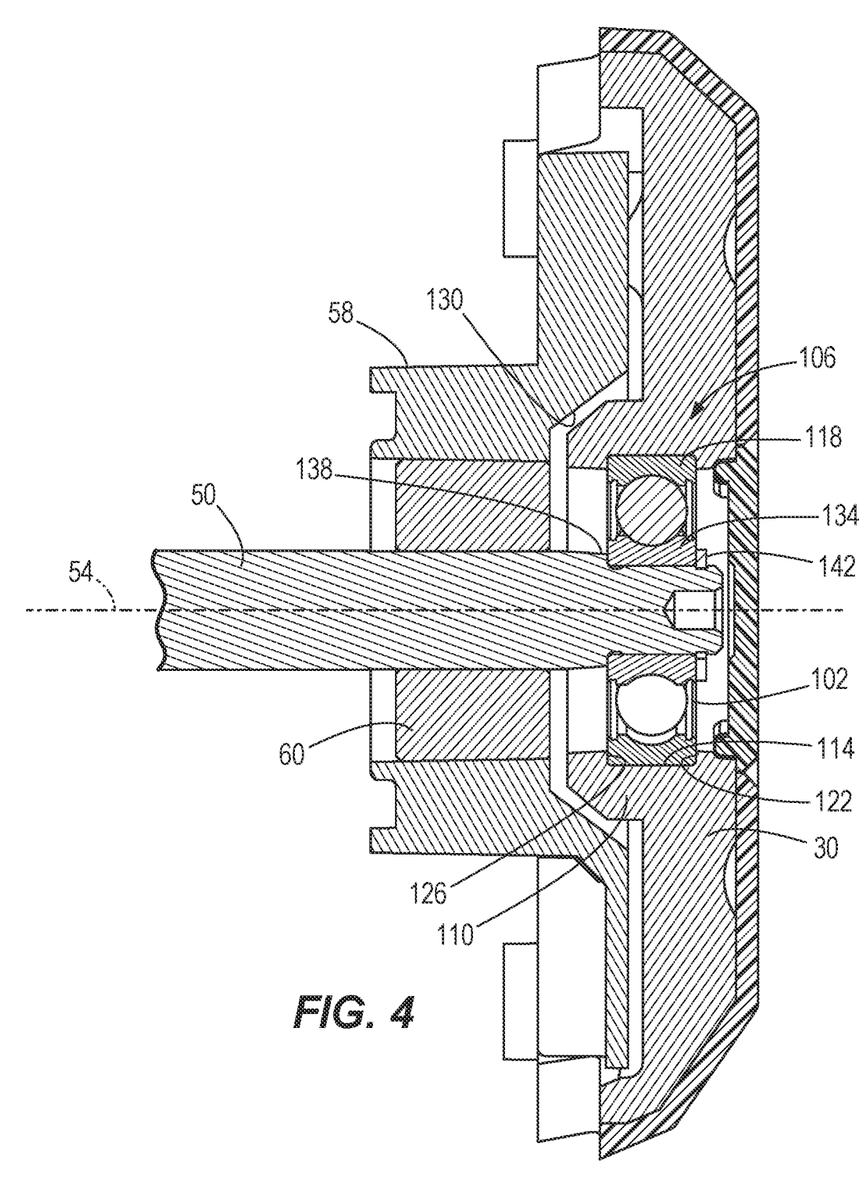
FIG. 4 is an enlarged cross-sectional view of a portion of the power tool of FIG. 1, illustrating the bearing retainer.

Best illustrated in FIG. 4, the bearing retainer 106 includes a first wall 110 extending forward (i.e. in a direction parallel to the rotational axis 54 and toward the front housing portion 22) from an inner side of the end cap 30. The first wall 110 includes a cylindrical recess or groove 114 in which an outer race 118 of the rear bearing 102 is received. The recess 114 is bounded by opposed second and third walls 122, 126, which respectively engage the back and front sides of the outer race 118. Accordingly, the first wall 110 radially secures the outer race 118 to the end cap 30 by engaging a radial (i.e. outer) side of the outer race 118, and the second and third walls 122, 126 axially secure the outer race 118 to the end cap 30 by engaging respective axial (i.e. front and back) sides of the outer race 118. The illustrated bearing retainer 106 is integrally formed with the end cap 30.

In the illustrated embodiment, the fan 58 includes a frusto-conical recess 130 formed in its rear side. The bearing retainer 106 extends into the frusto-conical recess 130 such that at least a portion of the bearing retainer 106 and at least a portion of the rear bearing 102 overlap the fan 58 along the axis 54. In other words, at least one line can be drawn in a radially outward direction from the bearing retainer 106 and the rear bearing 102 that intersects the fan 58. This overlapping arrangement advantageously reduces the axial length of the impact wrench 10.

With continued reference to FIG. 4, an inner race 134 of the rear bearing 102 is coupled to the output shaft 50 (e.g., via a press-fit). The inner race 134 is disposed between a shoulder 138 on the output shaft 50 and a snap ring 142 coupled to the output shaft 50 opposite the shoulder 138. The shoulder 138 and the snap ring 142 are engageable with the inner race 134 to axially secure the inner race 134 to the output shaft 50. In some embodiments, the inner race 134 may be omitted, and the output shaft 50 may have a journaled portion acting as the inner race.

Figure 5:
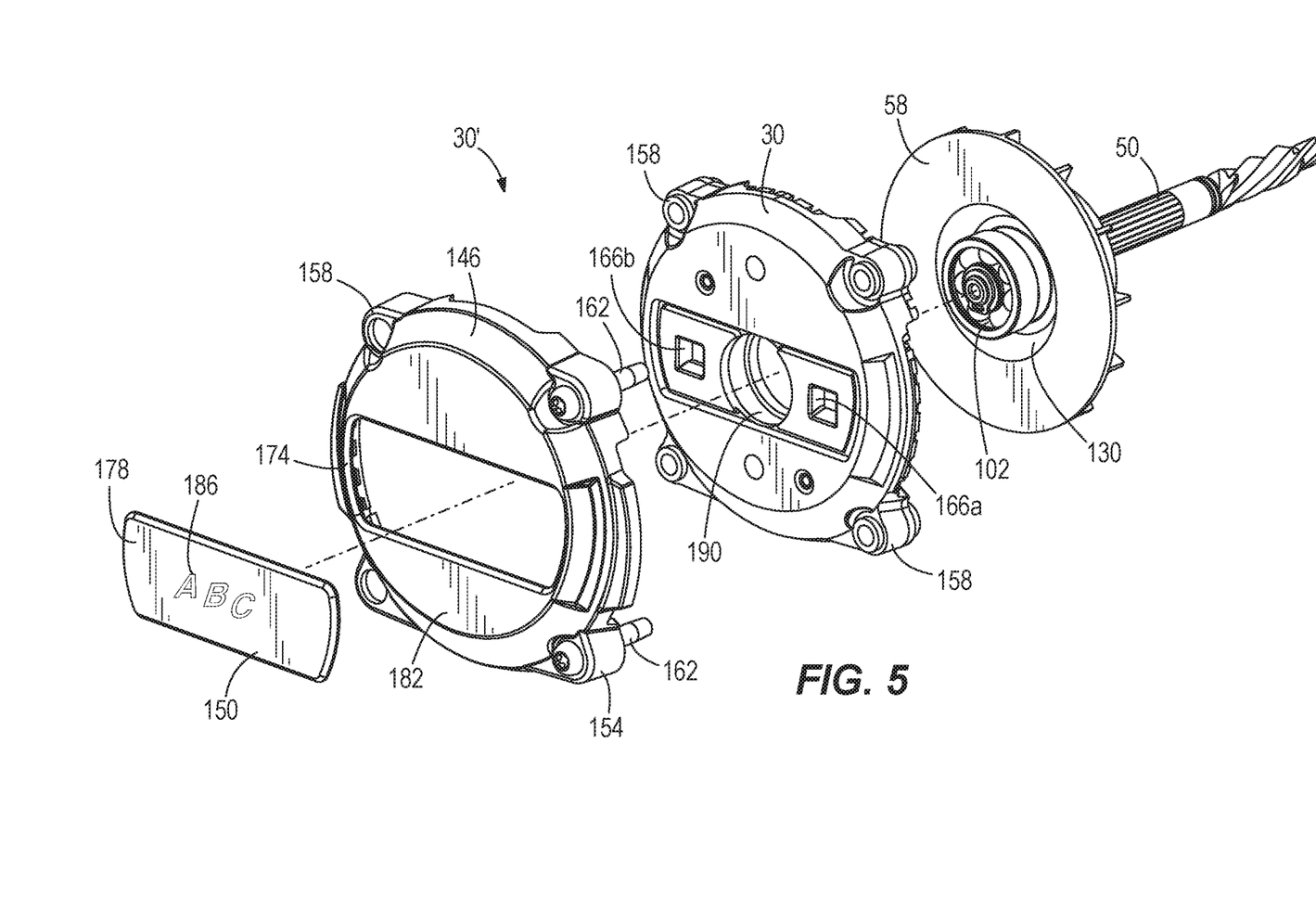
FIG. 5 is an exploded rear perspective view of the portion of the power tool of FIG. 4.
Figure 6:
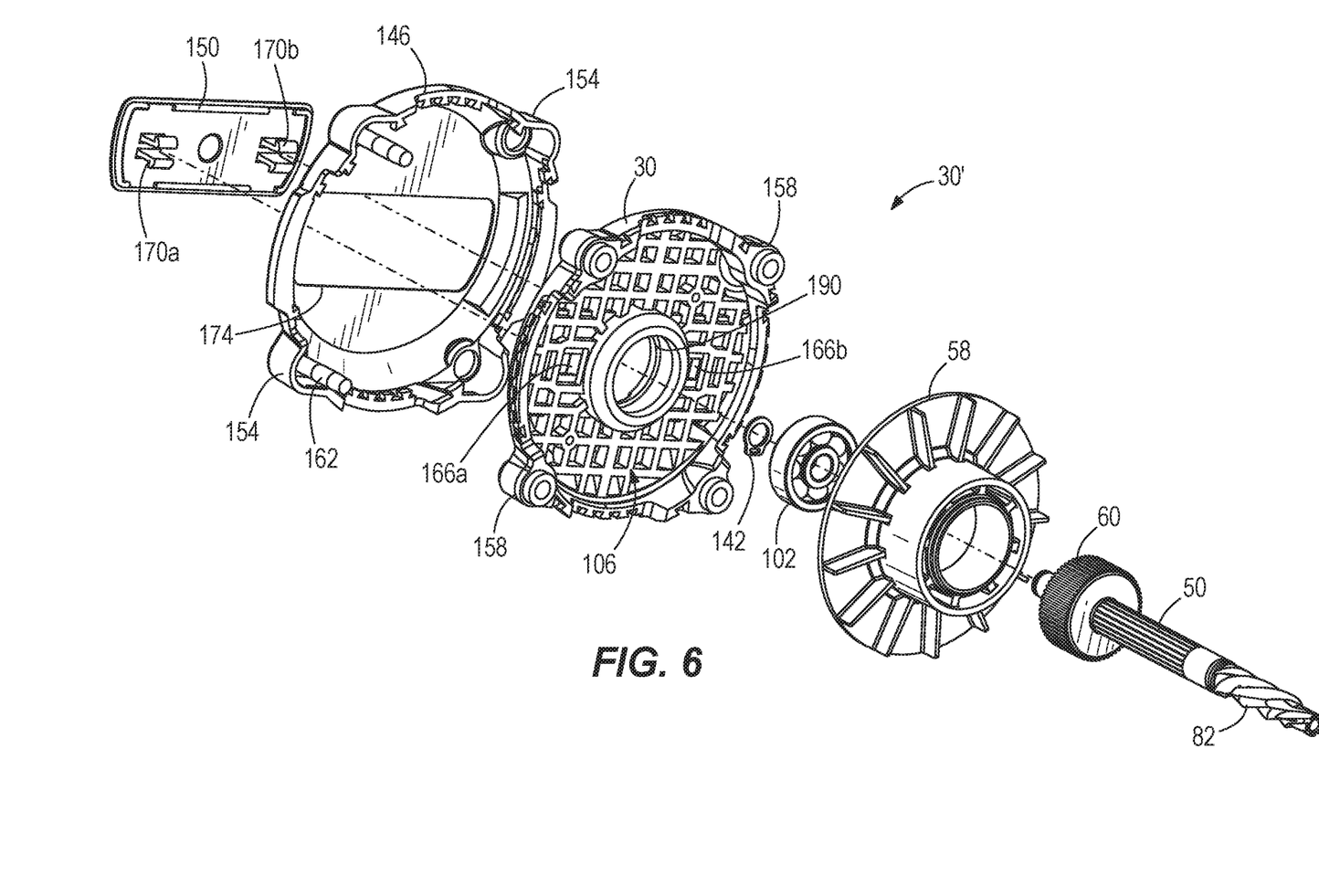
FIG. 6 is an exploded front perspective view of the portion of the power tool of FIG. 4.

Referring to FIGS. 5 and 6, the illustrated impact wrench 10 further includes an end cover 146 that at least partially overlies the end cap 30 and an end plate 150 coupled to the end cap 30. The end cap 30, end cover 146, and end plate 150 collectively define an end cap assembly 30'. The end cover 146 is overmolded on the end cap 30 such that the end cover 146 and the end cap 30 form a single, unitary component. For the purpose of illustration, however, the end cover 146 is shown separated from the end cap 30. Alternatively, the end cover 146 may be a separate component coupled to the end cap 30 in a variety of ways, such as via a snap fit. The end cover 146 includes a plurality of bosses 154 that align with a corresponding plurality of bosses 158 on the end cap 30. The end cap 30 is coupled to the motor housing portion 18 by a plurality of fasteners 162 that extend through the bosses 154, 158. In other embodiments, the end cap 30 may be integrally formed with the motor housing portion 18.

Referring to FIG. 6, the end cap 30 includes first and second receptacles 166a, 166b, and the end plate 150 includes first and second pairs of resilient tabs 170a, 170b that are insertable into the receptacles 166a, 166b to provide a snap-fit that couples the end plate 150 to the end cap 30. The end cover 146 includes an opening 174 having a shape corresponding with the shape of the end plate 150. The end plate 150 is received within the opening 174 when coupled to the end cap 30 such that a rear surface 178 of the end plate 150 is generally flush with a rear surface 182 of the end cover 146 (FIG. 1). In some embodiments, the end plate 150 may include indicia 186 on the rear surface 178 (FIG. 5). The indicia 186 may be raised, recessed, or printed on the rear surface 178. The indicia 186 may indicate a brand name, logo, tool name, model number information, serial number information, performance information, and the like.

Figure 7:
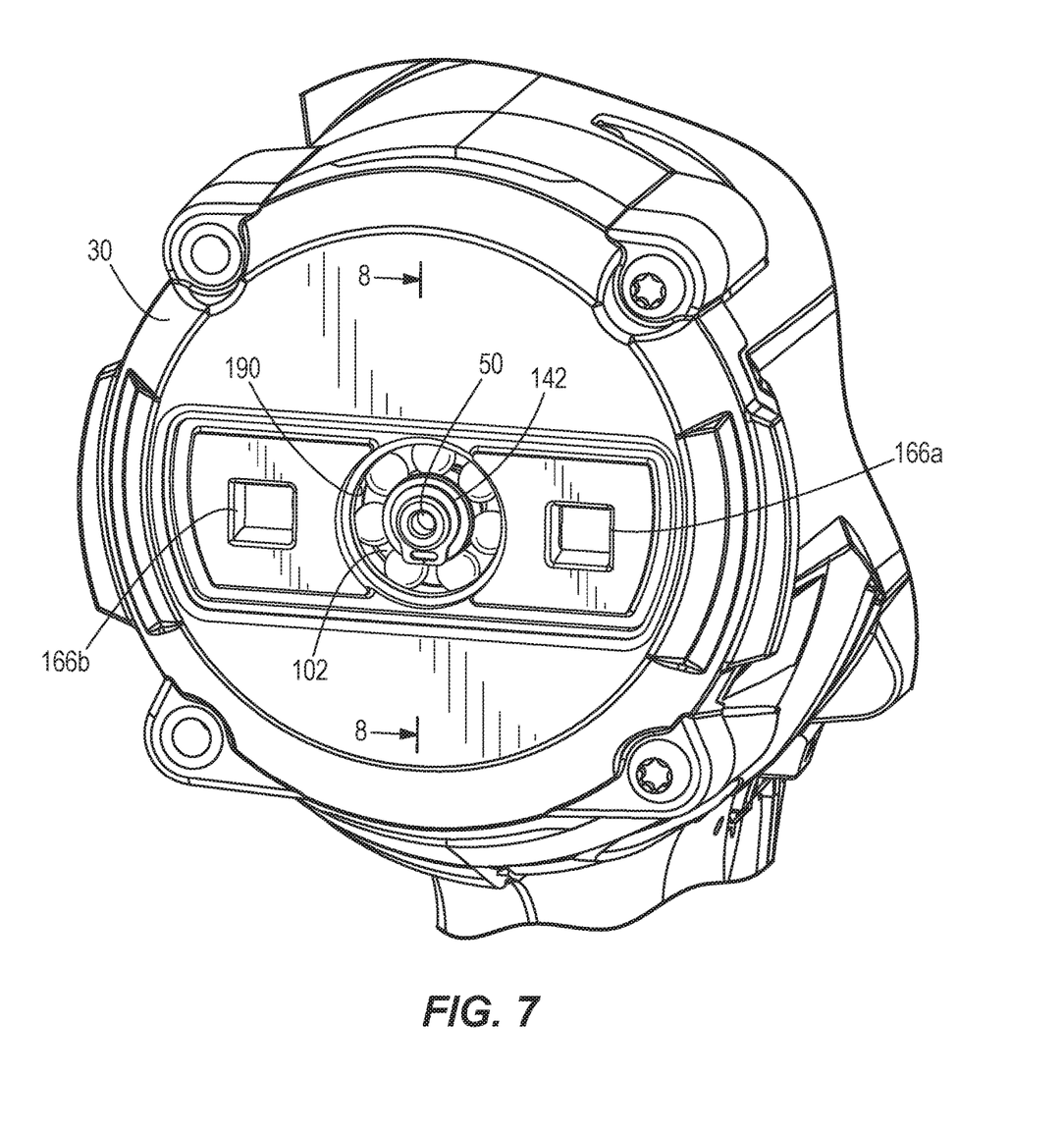
FIG. 7 is a rear view of the power tool of FIG. 1, with an end plate and an end cover removed.

The illustrated end cap 30 also includes a circular aperture 190 extending through the center of the end cap 30. The rear bearing 102 is accessible through the aperture 190 from the rear side of the end cap 30 when the end plate 150 is removed (FIG. 7). When the end plate 150 is coupled to the end cap 30, the end plate 150 covers the aperture 190 and the bearing 102.

The illustrated embodiment of the end cap assembly 30' facilitates assembly of the impact wrench 10. For example, the rear bearing 102 can be insert-molded within the bearing retainer 106 of the end cap 30. Then, the motor output shaft 50 can be press-fit into the rear bearing 102. The circular aperture 190 in the end cap 30 allows a mandrel (not shown) to be positioned against the rear side of the bearing 102 to brace the bearing 102 during press-fitting. Next, the snap ring 142 is positioned on the end of the output shaft 50. The end plate 150 can then be snapped into position to cover the bearing 102 and the aperture 190. In some embodiments, the end plate 150 may be removable after installation to facilitate cleaning and lubricating the rear bearing 102.

The drive assembly 70 of the impact wrench 10 will now be described with reference to FIG. 3. The drive assembly 70 includes an anvil 200, extending from the front housing portion 22, to which a tool element (not shown) can be coupled for performing work on a workpiece (e.g., a fastener). The drive assembly 70 is configured to convert the constant rotational force or torque provided by the gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the drive assembly 66 includes the camshaft 94, a hammer 204 supported on and axially slidable relative to the camshaft 94, and the anvil 200.

With continued reference to FIG. 3, the drive assembly 70 further includes a spring 208 biasing the hammer 204 toward the front of the impact wrench 10 (i.e., in the right direction of FIG. 3). In other words, the spring 208 biases the hammer 204 in an axial direction toward the anvil 200, along the axis 54. A thrust bearing 212 and a thrust washer 216 are positioned between the spring 208 and the hammer 204. The thrust bearing 212 and the thrust washer 216 allow for the spring 208 and the camshaft 94 to continue to rotate relative to the hammer 204 after each impact strike when lugs (not shown) on the hammer 204 engage with corresponding anvil lugs 220 and rotation of the hammer 204 momentarily stops. The camshaft 94 further includes cam grooves 224 in which corresponding cam balls 228 are received. The cam balls 228 are in driving engagement with the hammer 204 and movement of the cam balls 228 within the cam grooves 224 allows for relative axial movement of the hammer 204 along the camshaft 94 when the hammer lugs and the anvil lugs 220 are engaged and the camshaft 94 continues to rotate.

In operation of the impact wrench 10, an operator depresses the switch 62 to activate the motor 42, which continuously drives the gear assembly 66 and the camshaft 94 via the output shaft 50. The helical engagement between the pinion 82 and the planet gears 86 produces a forward-directed thrust load along the axis 54 of the output shaft 50 (i.e., toward the drive assembly 70, which is transmitted to the rear bearing 102. The bearing 102 is secured against this thrust load by the bearing retainer 106.

As the camshaft 94 rotates, the cam balls 228 drive the hammer 204 to co-rotate with the camshaft 94, and the drive surfaces of hammer lugs engage, respectively, the driven surfaces of anvil lugs 220 to provide an impact and to rotatably drive the anvil 200 and the tool element. After each impact, the hammer 204 moves or slides rearward along the camshaft 94, away from the anvil 200, so that the hammer lugs disengage the anvil lugs 220. As the hammer 204 moves rearward, the cam balls 228 situated in the respective cam grooves 224 in the camshaft 94 move rearward in the cam grooves 224. The spring 208 stores some of the rearward energy of the hammer 204 to provide a return mechanism for the hammer 204. After the hammer lugs disengage the respective anvil lugs 220, the hammer 204 continues to rotate and moves or slides forwardly, toward the anvil 200, as the spring 208 releases its stored energy, until the drive surfaces of the hammer lugs re-engage the driven surfaces of the anvil lugs 220 to cause another impact.

FIGS. 8-11D illustrate a bearing retainer 306 according to another embodiment and usable with the power tool 10 of FIG. 1. The bearing retainer 306 is similar to the bearing retainer 106 described above with reference to FIGS. 1-7, and features and elements of the bearing retainer 306 corresponding with features and elements of the bearing retainer 106 are given like reference numbers.

Figure 8:
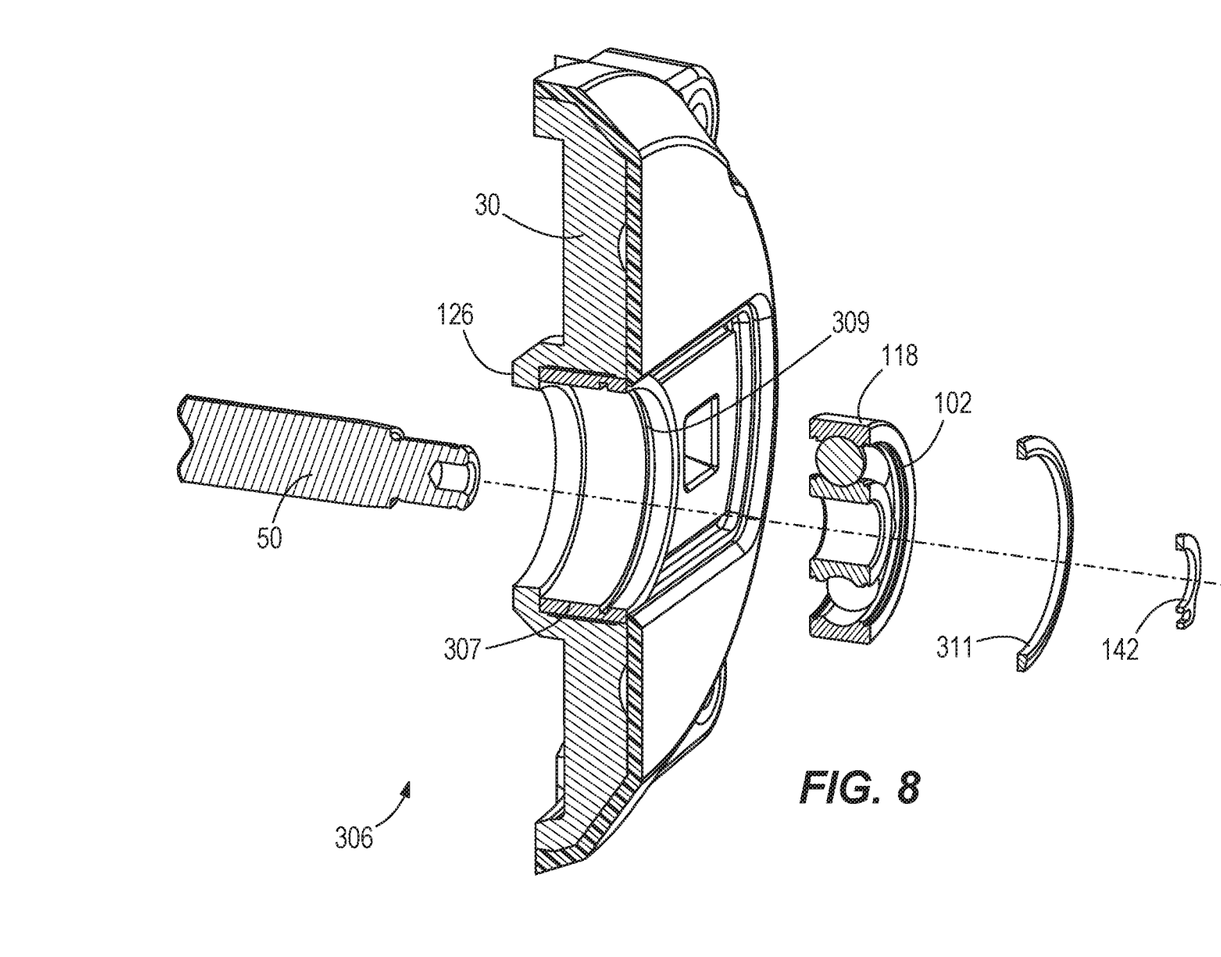
FIG. 8 is an exploded cross-sectional view of a bearing retainer according to another embodiment of the invention.
Figure 9:
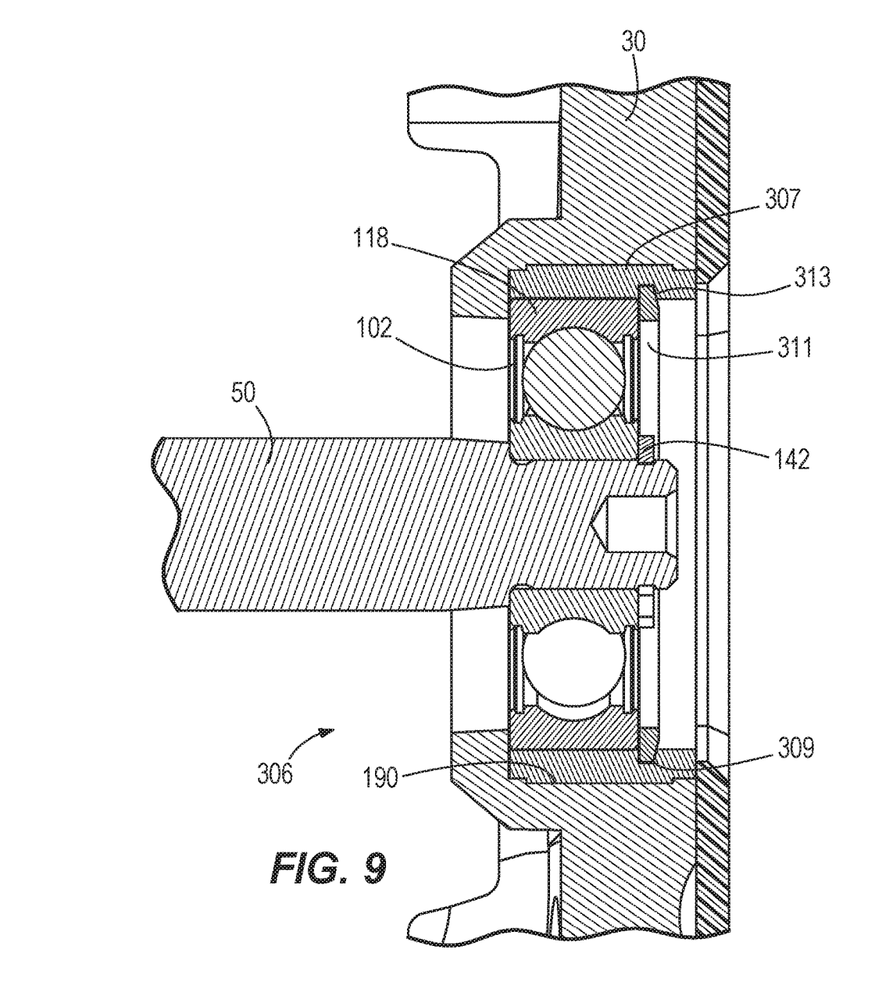
FIG. 9 is an assembled cross-sectional view of the bearing retainer of FIG. 8.
Figure 10:
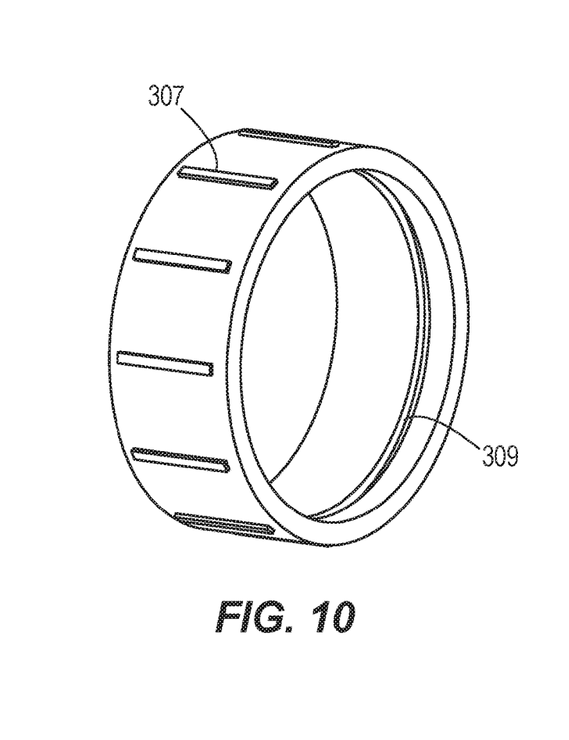
FIG. 10 is a perspective view of a bushing of the bearing retainer of FIG. 8.

The illustrated bearing retainer 306 includes a bushing 307 fixed within the circular aperture 190 of the end cap 30 (FIGS. 8-10). The bushing 307 may be press-fit into the circular aperture 190, or the bushing 307 may be insert-molded within the end cap 30. The rear bearing 102 is received within the bushing 307 such that the bushing 307 is situated between the rear bearing 102 and the end cap 30 in a radial direction to radially secure the bearing 102. In some embodiments, the outer race 118 may be press-fit into the bushing 307; alternatively, the outer race 118 and the bushing 307 may have a close, sliding fit.

With reference to FIGS. 8 and 9, the bushing 307 includes a groove 309 that receives a retaining ring 311. In the illustrated embodiment, the retaining ring 311 includes a beveled rear face 313. The retaining ring 311 is resiliently compressed upon insertion into the groove 309 such that the retaining ring 311 exerts a radially-outward recovery force on the groove 309. Accordingly, engagement between the beveled rear face 313 and the groove 309 biases the retaining ring 311 in a forward axial direction (i.e. to the left in FIG. 9) and into engagement with the outer race 118 of the rear bearing 102. The outer race 118 is axially secured between the retaining ring 311 and the third wall 126 of the bearing retainer 306. Thus, the retaining ring 311 replaces the second wall 122 of the bearing retainer 106 described above with reference to FIG. 4.

Figure 11A:
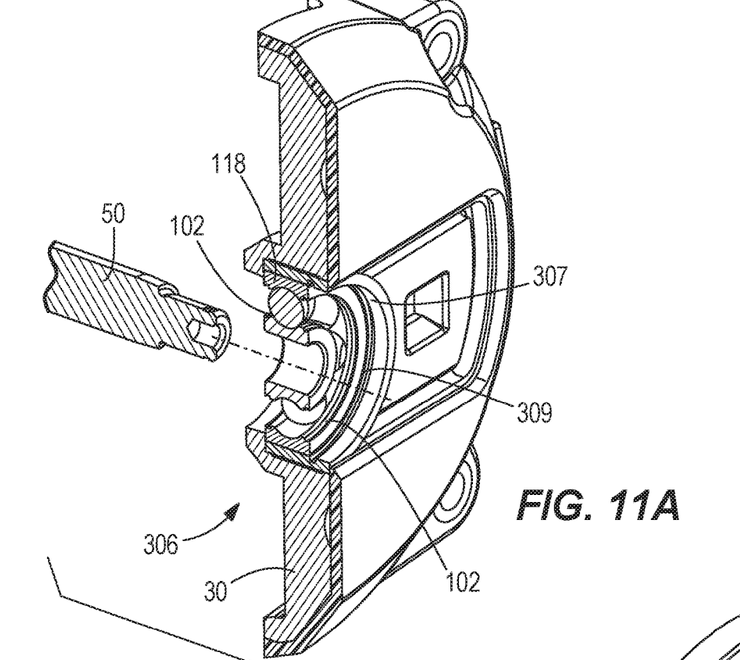
FIGS. 11A-11D illustrate assembly of the bearing retainer of FIG. 8.
Figure 11B:
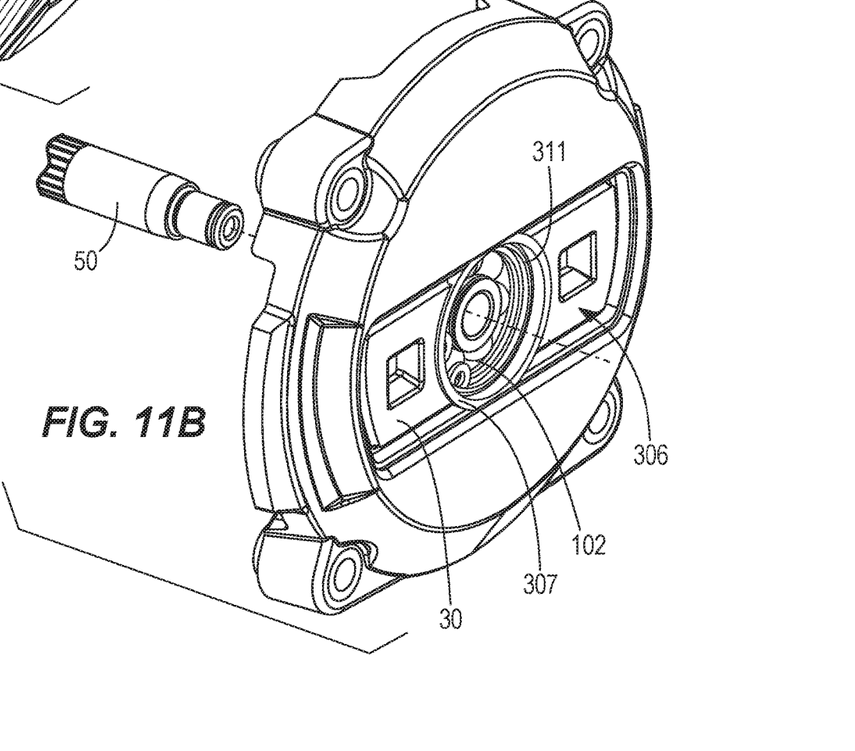
Figure 11C:
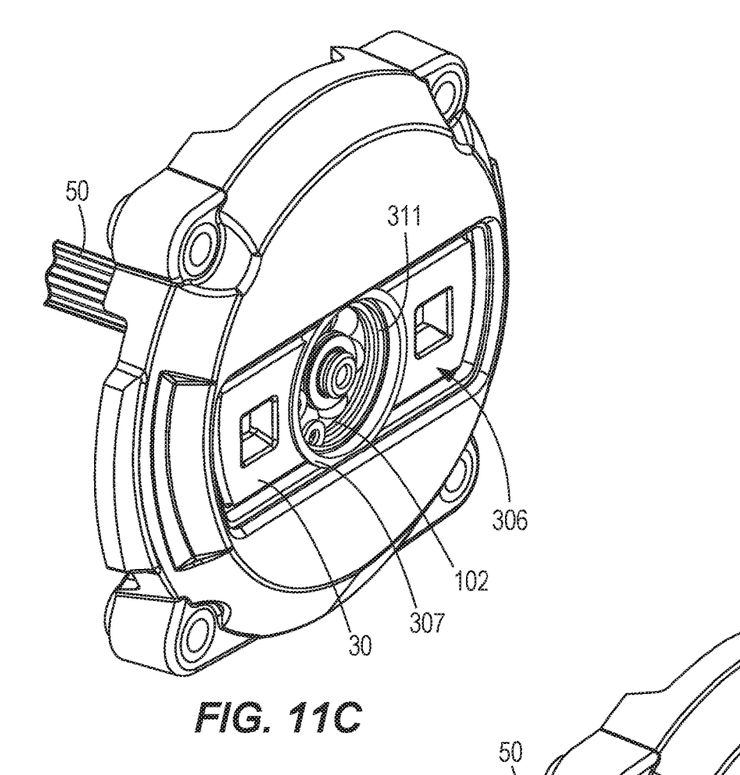
Figure 11D:
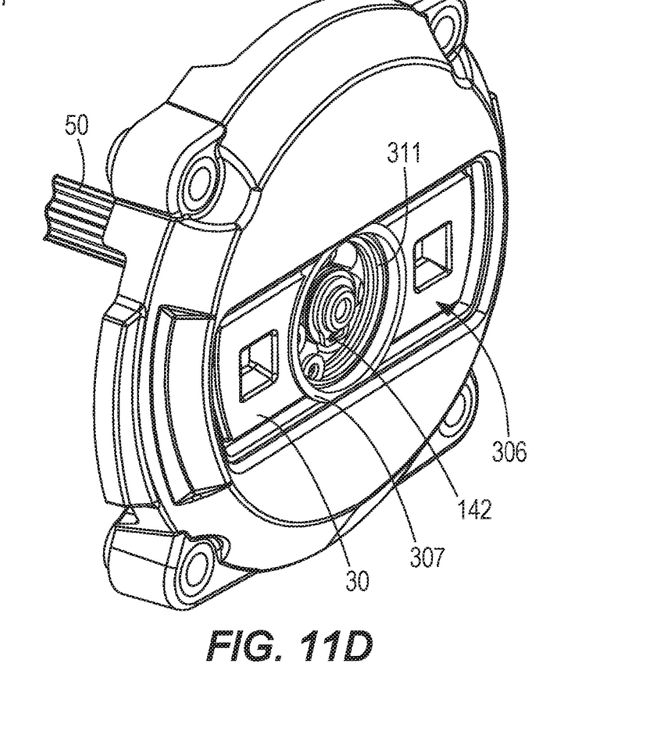

Referring to FIGS. 11A-11D, the bearing retainer 306 permits the rear bearing 102 to be removed from the end cap 30 and therefore allows the output shaft 50, rear bearing 102, and end cap 30 to be serviced independently. During assembly, the bushing 307 can be insert-molded or press-fit within the end cap 30. Then, the rear bearing 102 is slid or pressed into the bushing 307 (FIG. 11A). Next, the retaining ring 311 is compressed (e.g., by drawing together split ends of the retaining ring 311; not shown) and inserted into the groove 309 (FIG. 11B). Next, the motor output shaft 50 is slid or pressed into the rear bearing 102 (FIG. 11C). The snap ring 142 is then positioned on the end of the output shaft 50 (FIG. 11D). Disassembly for servicing may occur generally by reversing these steps.

Figure 12:
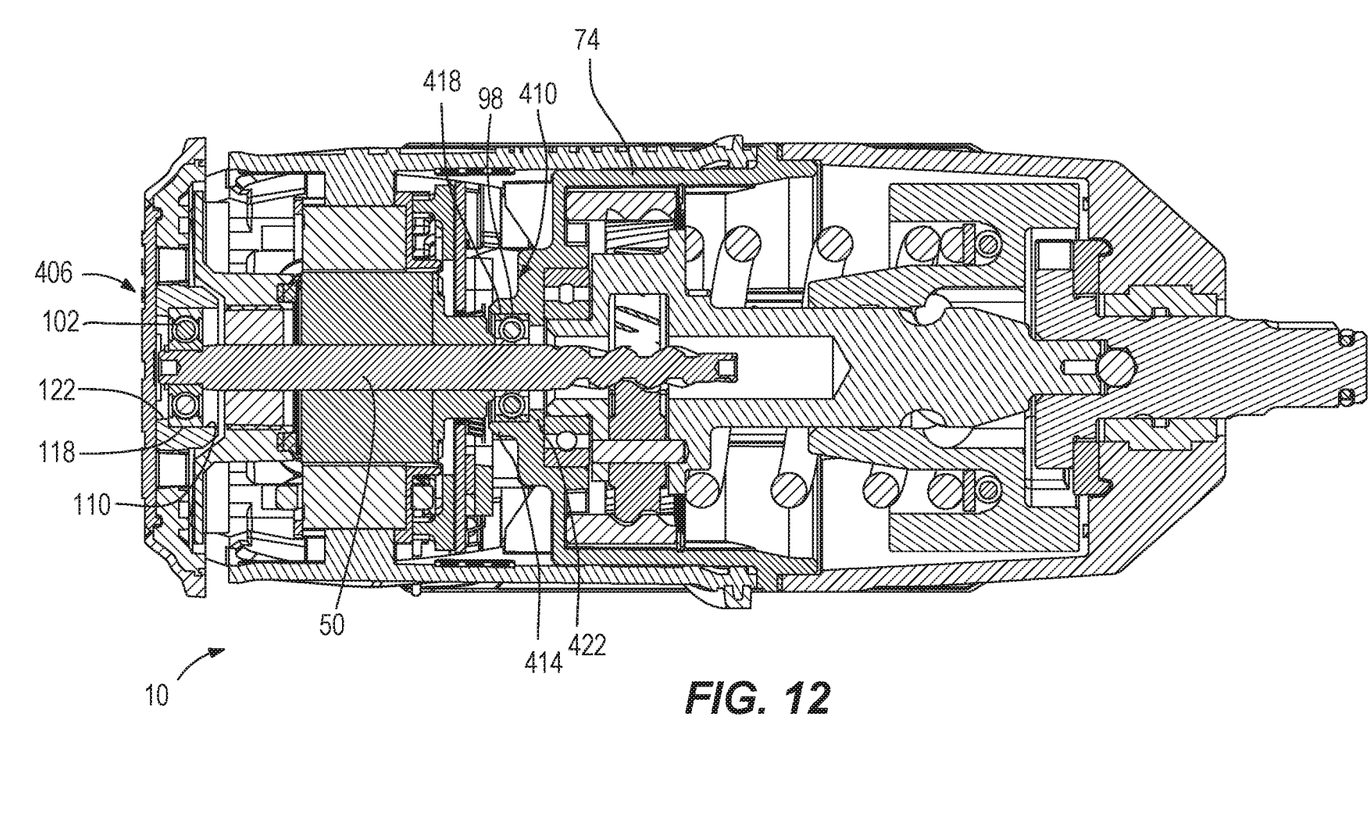
FIG. 12 is a cross-sectional view of the power tool of FIG. 1 including a bearing retainer according to another embodiment.

FIG. 12 illustrates the power tool 10 including a bearing retainer 406 according to another embodiment. The bearing retainer 406 is similar to the bearing retainer 106 described above with reference to FIGS. 1-7, and features and elements of the bearing retainer 406 corresponding with features and elements of the bearing retainer 106 are given like reference numbers. In addition, the following description focuses primarily on differences between the bearing retainer 406 and the bearing retainer 106.

In the illustrated embodiment of the bearing retainer 406, the third wall 126 (FIG. 4) is removed. As such, the bearing retainer 406 only includes the first wall 110 that radially secures the outer race 118 of the rear bearing 102 and the second wall 122 that engages the back side of the outer race 118 to axially secure the rear bearing 102 in a rearward axial direction. That is, the second wall 122 engages the back side of the outer race 118 to resist rearward axial forces generated due to rotation of the output shaft 50.

A second bearing retainer 410 is provided to retain the forward bearing 98. The second bearing retainer 410 includes a first annular wall 414 that surrounds an outer race 418 of the forward bearing 98 to radially secure the forward bearing 98. A second annular wall 422 extends radially inward from the first annular wall 414 to engage a front side of the outer race 418. Thus, the second annular wall 422 axially secures the forward bearing 98 in a forward axial direction. That is, the second wall 422 engages the front side of the outer race 418 to resist forward axial forces generated due to rotation of the output shaft 50.

In the illustrated embodiment, the second bearing retainer 410 is integrally formed with the gear case 74. In other embodiments, the second bearing retainer 410 may include other components coupled to the gear case 74 (e.g., one or more bushings, retaining rings, or the like).

Figure 13:
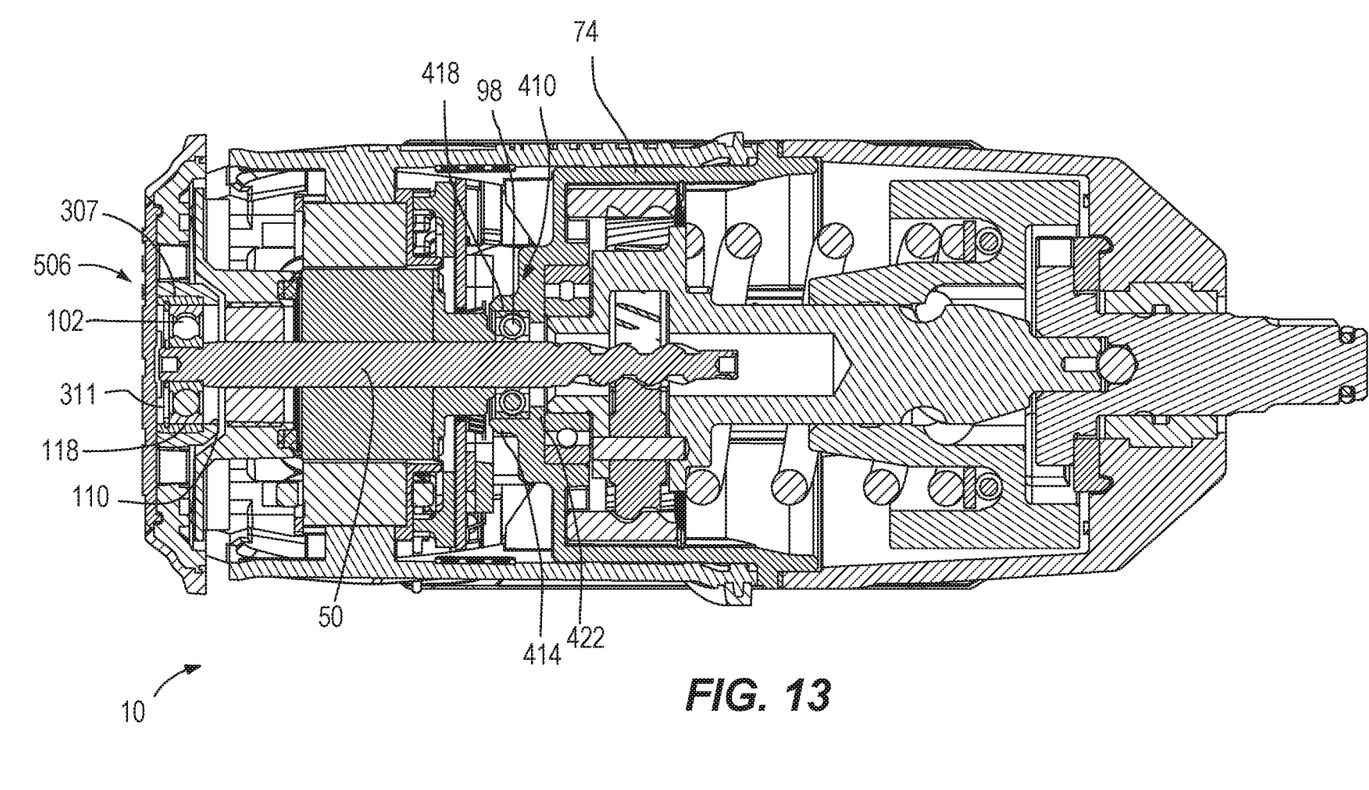
FIG. 13 is a cross-sectional view of the power tool of FIG. 1 including a bearing retainer according to another embodiment.

FIG. 13 illustrates the power tool 10 including a bearing retainer 506 according to another embodiment. The bearing retainer 506 is similar to the bearing retainer 406 described above with reference to FIG. 12, but includes the bushing 307 and the retaining ring 311 of the bearing retainer 306 described above with reference to FIGS. 8-11D. The power tool of FIG. 13 also includes a front bearing retainer 410 identical to that described above and shown in FIG. 12.

Various features of the invention are set forth in the following claims.

What is claimed is:
1. A power tool comprising:
a motor housing;
a motor supported within the motor housing, the motor including an output shaft defining an axis extending in a front to rear direction of the power tool;
a fan coupled for co-rotation with the output shaft;
a bearing configured to support the output shaft for rotation about the axis;
an end cap removably coupled to a rear end of the motor housing and including an aperture through which the bearing is accessible;
an end plate removably coupled to a rear side of the end cap and configured to cover the aperture when the end plate is coupled to the end cap; and
a bearing retainer integrally formed with the end cap, the bearing retainer configured to axially and radially secure the bearing to the end cap,
wherein the bearing retainer includes a first wall engaging a radial side of the bearing to radially secure the bearing and a second wall engaging a front side of the bearing to axially secure the bearing, and
wherein the second wall is integrally formed with the end cap as a single piece.

2. The power tool of claim 1, wherein the fan includes a recess in which the bearing retainer is at least partially received such that the bearing retainer and the bearing overlap the fan in a radial direction of the output shaft.

3. The power tool of claim 1, wherein the end cap includes a receptacle, and wherein the end plate includes a resilient tab insertable into the receptacle to provide a snap-fit that removably couples the end plate to the end cap.

4. The power tool of claim 1, wherein the end plate includes indicia.

5. The power tool of claim 1, wherein the bearing is insert molded within the bearing retainer.

6. The power tool of claim 1, further comprising a gear assembly including a plurality of helical planet gears, wherein the output shaft includes a helical pinion meshed with the helical planet gears such that rotation of the output shaft produces an axial force on the output shaft that is resisted by the bearing retainer.

7. A power tool comprising:
a housing including a motor housing portion and a front housing portion coupled to the motor housing portion;
a motor supported within the motor housing portion, the motor including an output shaft defining an axis, the output shaft having a shoulder;
a fan coupled for co-rotation with the output shaft;
an end cap removably coupled to the motor housing portion opposite the front housing portion;
an end plate removably coupled to a rear side of the end cap;
a bearing configured to support the output shaft for rotation about the axis, wherein the bearing includes an inner race coupled to the output shaft and an outer race coupled to the end cap;
an anvil extending from the front housing portion; and
a drive assembly configured to convert torque from the output shaft into a striking rotational force on the anvil,
wherein the end cap includes a bearing retainer with a first wall extending parallel to the axis and opposed second and third walls extending transverse to the axis,
wherein the first wall engages a radial side of the outer race of the bearing to radially secure the bearing,
wherein the second and third walls engage opposite axial sides of the outer race of the bearing, and the shoulder engages the inner race of the bearing, to axially secure the bearing.

8. The power tool of claim 7, wherein the bearing is insert molded within the bearing retainer.

9. The power tool of claim 7, wherein the fan includes a recess in which the bearing retainer is at least partially received such that the bearing retainer and the bearing overlap the fan in a radial direction of the output shaft.

10. The power tool of claim 7, wherein the end cap includes an aperture through which the bearing is accessible.

11. The power tool of claim 7, wherein the first wall, the second wall, and the third wall are integral portions of the end cap.

12. A power tool comprising:
a housing including a removable end cap defining a rear end of the housing and an end plate removably coupled to a rear side of the end cap;
a motor supported within the housing, the motor including an output shaft defining an axis;
a fan coupled for co-rotation with the output shaft, the fan including a recess; and
a bearing configured to support the output shaft for rotation about the axis, the bearing positioned between the end cap and the fan and including a rear surface facing the end cap and a front surface facing the fan,
wherein the end cap includes a bearing retainer with a first wall extending parallel to the axis and opposed second and third walls extending transverse to the axis, the first wall engaged with a radial side of the bearing to radially secure the bearing,
wherein the second and third walls engage opposite axial sides of the bearing to axially secure the bearing, and
wherein the bearing retainer extends axially beyond the front surface of the bearing and into the recess of the fan.

13. The power tool of claim 12, further comprising a gear assembly including a plurality of planet gears meshed with a pinion of the motor.

14. The power tool of claim 12, further comprising an anvil extending from a front end of the housing.

* * * * *